Dec. 14, 1943.  C. S. ASH  2,336,767
WHEEL MOUNTING MEANS
Filed Nov. 7, 1941  3 Sheets-Sheet 1
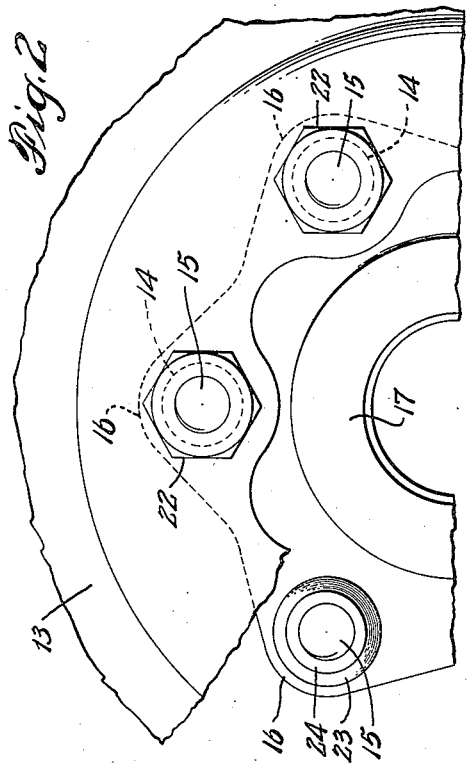
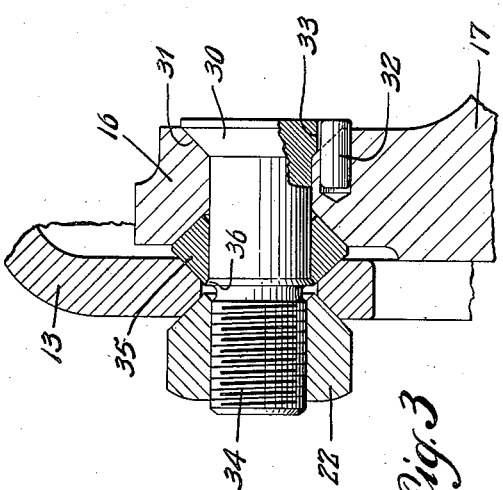
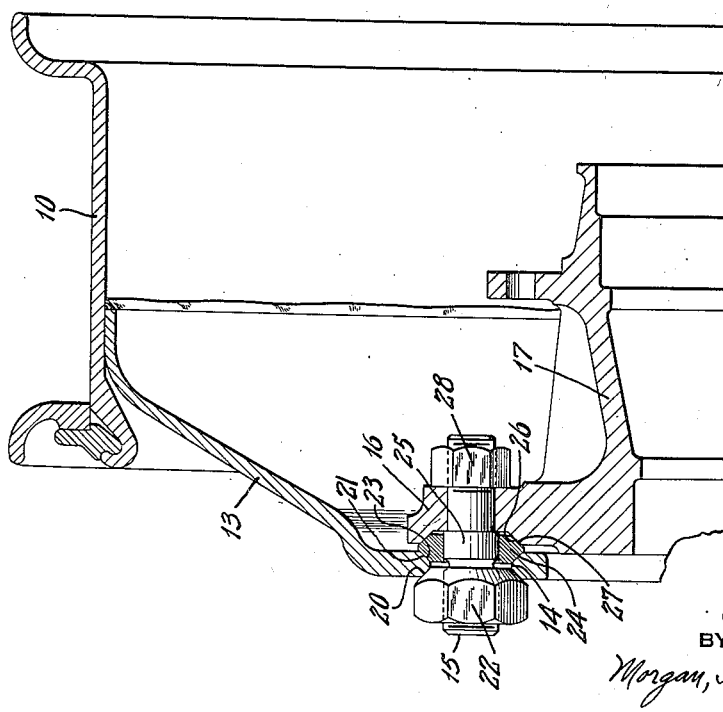
INVENTOR:
CHARLES S. ASH
BY
Morgan, Finnegan + Durham
ATTORNEYS.

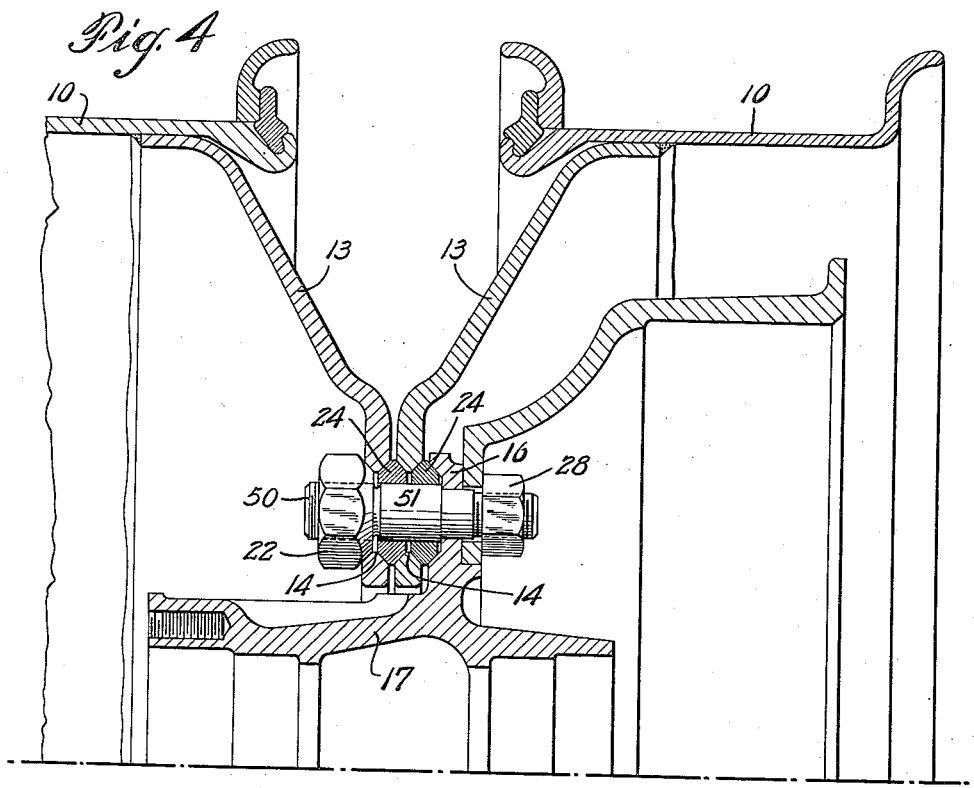
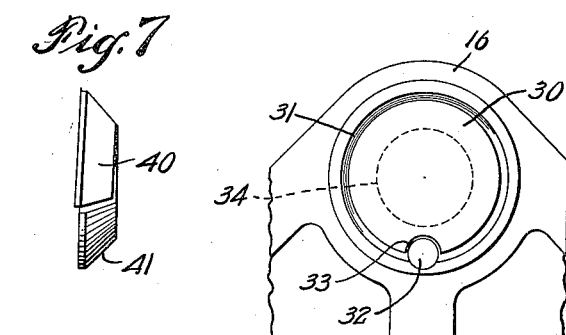
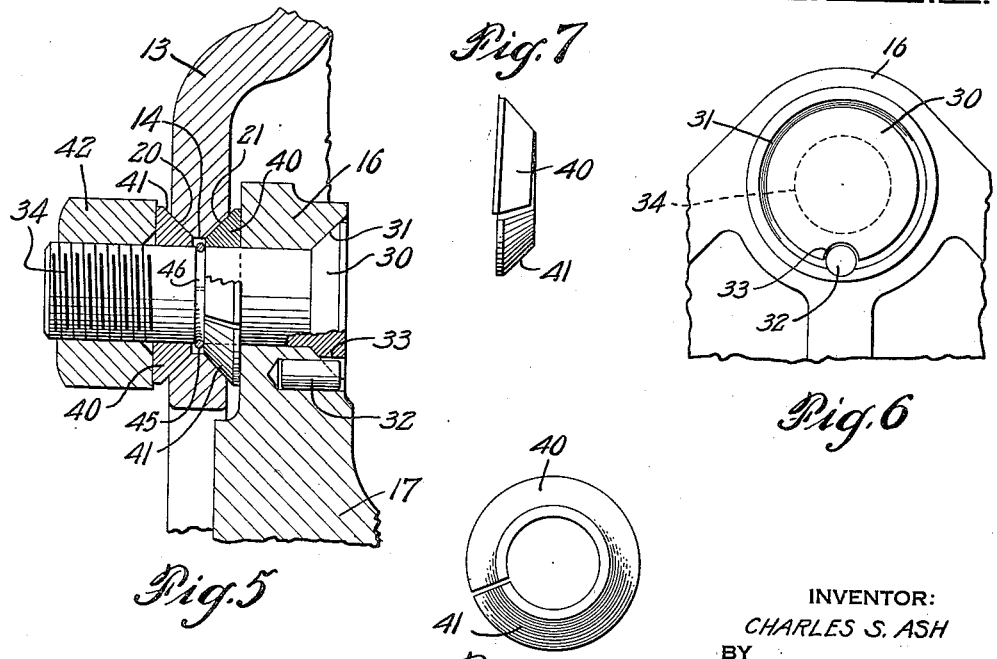
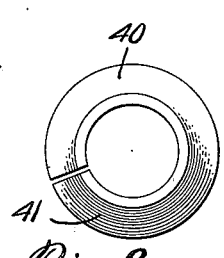

Dec. 14, 1943.   C. S. ASH   2,336,767
WHEEL MOUNTING MEANS
Filed Nov. 7, 1941   3 Sheets-Sheet 3

INVENTOR:
CHARLES S. ASH
BY
Morgan, Finnegan & Durham
ATTORNEYS.

Patented Dec. 14, 1943

2,336,767

UNITED STATES PATENT OFFICE 2,336,767

WHEEL MOUNTING MEANS

Charles S. Ash, Milford, Mich.

Application November 7, 1941, Serial No. 418,118

9 Claims. (Cl. 301—9)

The present invention relates to wheel mounting means, and more particularly to novel and improved means for mounting tire carrying rims and wheels upon their supporting hubs.

Objects and advantages of the invention will be set forth in part hereinafter and in part will be obvious hereform, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a cross section of a rim, wheel and hub assembly showing one embodiment of my improved mounting means, only a half of the complete assembly being shown;

Fig. 2 is a side elevation of a wheel assembly such as shown in Fig. 1 looking from the outside of the wheel, certain parts being broken away for greater clarity;

Fig. 3 is a detailed sectional view of another embodiment of my improved mounting means;

Fig. 4 is a cross section of a dual wheel and rim assembly showing an embodiment of my invention as applied thereto;

Fig. 5 is a detailed sectional view of still another embodiment of my invention as applied to the mounting of a single wheel upon its hub;

Fig. 6 is a detailed side elevation of the hub spoke and wheel retaining bolt shown in Fig. 5;

Fig. 7 is a side elevation of certain of the novel mounting means of the embodiment shown in Fig. 5;

Fig. 8 is an end elevation of the member shown in Fig. 7;

Figure 9:
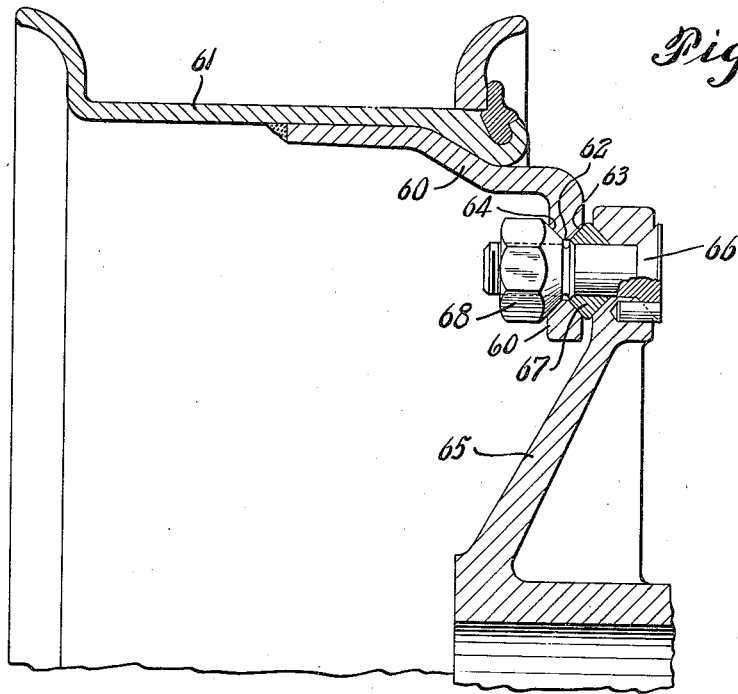
Fig. 9 is a cross section of a rim, wheel and hub showing one embodiment of the present invention as applied to a wheel assembly in which the rim is provided with lugs for attachment to the vehicle wheel.

The invention has for an object the provision of a novel and improved mounting means for mounting a wheel rim upon a rotatable wheel hub. Another object of the invention is the provision of such mounting means which may be located between a rim and its wheel or between a wheel and its hub, which may be utilized on wheels and rims of conventional and present commercial construction, and which may be used with single or multiple wheeled assemblies. The invention provides a safer, more efficient, more economical and more reliable wheel and rim mounting than those heretofore known, and one that is more satisfactory in use. A further object is to provide means for mounting a vehicle rim on a wheel, or a vehicle wheel with rim attached upon a hub, which is steady and non-loosening under all operating conditions and which makes lighter construction of the members of the wheel assembly possible. The invention provides a vehicle rim with attached lug construction which is more economical to manufacture and more truly aligned in finished form than conventional rim and lug assemblies. Still a further object is to provide a wheel and rim and mounting which is free of many of the damaging strains which are responsible for deteriorating wear and break downs experienced with conventional wheel mountings, and the invention will be found to be particularly useful and valuable when applied to vehicles carrying relatively heavy loads, such as trucks and trailers. The invention in one of its embodiments provides resilient take-up means between the wheel and hub which securely lock the members in assembled position.

In accordance with one illustrative embodiment here shown a vehicle wheel bearing a tire rim is mounted upon a wheel hub by means of a plurality of mounting and retaining bolts which pass through openings provided therefor near the inner periphery of the wheel web and into the wheel hub, nuts being provided on the other or outer end of the bolts to hold the assembly in place. The openings provided in the wheel are substantially circular and are countersunk on either side to form a pair of oppositely inclined or conical surfaces inclining toward the center of the width of the openings. Seated against these inclined surfaces are oppositely inclined surfaces of frusto-conical retaining nuts on the one side, and oppositely inclined annular enlarged portions of the mounting bolts on the other side, whereby the wheel web is securely bolted to and rotates with its hub and is supported and driven thereby entirely upon cooperatingly formed inclined surfacees. The conical surface of the mounting bolt presented to the wheel may be on a portion integral with said bolt or a member removably mounted thereon, and likewise the conical surface of the retaining nut may be integral therewith or a separate member of annular frusto-conical form provided and held in place against the wheel by an ordinary nut.

A further embodiment of the invention comprises a pair of frusto-conical locking washers which are slipped over the wheel mounting bolt of the hub and the inclined annular surfaces of which are adapted to seat in the cooperatingly inclined countersunk surfaces of the wheel already mentioned. The wheel is positioned on the mounting bolt with a locking washer on either side of the wheel web and the assembly is resiliently taken up and securely locked in assembled position by a nut of conventional form on the end of the mounting bolt. One embodiment of my invention comprises an annulus of substantially triangular cross section arranged between a pair of dual wheels to be mounted on a wheel hub, and this member engages the inclined surfaces of the bolt openings in the wheels as before, the wheels being otherwise mounted on a mounting bolt extending into the hub and secured by a nut in the manner described for a single wheel mounting.

A further embodiment of the invention comprises an attached lug type of tire rim demountably mounted on the vehicle wheel by means of the lugs. In this embodiment a plurality of circumferentially spaced apart lugs are fixed to the rim and extend radially inwardly therefrom. An opening is provided in the radially inwardly extending portion of each rim lug, and these openings are of the character already described for the openings in the wheel web when the web is to be demountably mounted on the wheel hub, each opening being substantially circular and countersunk on either side to form a pair of oppositely inclined surfaces of the lug adjacent the opening. Through each opening extends a mounting and retaining bolt which is anchored to the wheel at one end and is adapted to receive a nut at the other end for fixing the rim in mounted condition with respect to the wheel. The rim lugs, bearing the rim, are mounted on the mounting and retaining bolts, and thus on the wheel entirely upon inclined substantially circular cooperating surfaces, the bolts being provided with an inclined annular enlarged portion to seat in the countersunk lug opening on the side of the lug nearer the wheel, and the inclined portion of a frusto-conical retaining nut on the outer end of the bolt seating in the opening at the opposite side of the lug. In this embodiment, as well as when the rim is fixed to the wheel web and the web demountably mounted on the wheel hub, the inclined surfaces seating against the cooperatingly inclined surfaces of the lug may be presented by annular members slipped over the mounting bolt one positioned on either side of the lug, and these members may be in the form of frusto-conical locking washers. Moreover, a set of dual rims may be mounted in accordance with this embodiment of the invention, the lugs of each rim fitting over common mounting bolts on the wheel and having therebetween an annular of substantially triangular cross section the inclined faces of which seat in the countersunk openings of adjacent lugs.

Another embodiment of the present invention comprises a mounting means in which the mounting and retaining bolts are provided with an enlarged portion of triangular cross section. This embodiment is applicable to the demountable wheel-on-hub mounting and to the demountable rim-on-wheel mounting for either single or dual wheel assemblies. The annular enlarged portion is positioned between the wheel or lug and the hub or wheel respectively, one inclined surface thereof seating in the countersunk opening in the wheel or lug while the other inclined surface is seated in a countersunk area of the hub or wheel which surrounds the mounting and retaining bolt. The enlarged portion of the mounting bolt may be integral with the mounting bolt, or it may be a separate annular member of triangular cross section to be slipped over the mounting bolt before the wheel or rim is mounted thereon.

It will be understood that the foregoing general description and the following detailed description as well are exemplary and explanatory of the invention but are not restrictive thereof.

Referring now in detail to the various embodiments of the invention as illustrated by way of example in the accompanying drawings, a wheel assembly as illustratively shown in the embodiment of Fig. 1 comprises the pneumatic tire supporting rim 10 of conventional form which is welded or otherwise fixed to the wheel web 13. Near its inner periphery wheel web 13 is provided with a plurality of circumferentially spaced substantially circular openings 14 to receive the mounting bolts 15 extending axially out of the several outwardly extending spoke portions 16 of the rotatable wheel hub 17.

Each opening 14 in wheel 13 is countersunk to form the oppositely inclined conical surfaces 20, 21, surface 20 engaging the inclined surface of a frusto-conical nut 22 threaded on the outer end of bolt 15, while surface 21 engages one of the inclined surfaces 23 of a double conical mounting washer 24. This member is mounted upon an enlarged portion 25 of mounting bolt 15, and its other inclined surface 26 seats against the inclined face 27 of spoke 16 which is formed by angularly countersinking the face of the spoke adjacent the wheel and surrounding bolt 15. The mounting bolt may be held in the conventional manner by a nut 28 threaded thereon at the inner side of the spoke. It may be seen that the wheel 10 is quickly and efficiently mounted on its hub 17 by slipping mounting washers 24 over mounting bolts 15, placing the wheel so that each opening 14 accommodates a mounting bolt 15, putting on and tightening the frusto-conical nut 22.

In the embodiment of my invention shown by way of illustration in Fig. 3, the mounting bolt 34 may be provided at its inner end with a beveled head 30 which seats in the conically countersunk area 31 on the inner face of the hub spoke 16 and is held against rotation by a pin 32 which extends into the hub spoke and seats in an arcuate groove 33 in the beveled head 30. In this embodiment the mounting washer 35 is also of double conical form and is riveted into position by turning over the edge of the bolt 34 as indicated at 36.

The mounting means of the present invention may be utilized in the mounting of dual wheels upon a wheel hub, and as shown in Fig. 4, a pair of wheels 13 of the character already described are mounted on an elongated mounting bolt 50 having the enlarged portion 51 to receive a pair of the double conical mounting washers 24. The wheel mounting and assembly is thus the same as that already described for the embodiment shown in Fig. 1, except that an elongated mounting bolt 50 is provided and a mounting washer 24 inserted between the pair of dual wheels.

In the embodiment of the invention illustratively shown in Fig. 9 a plurality of circumferentially spaced apart rim lugs 60 are fixed, as by welding, to the inner cylindrical surface of a pneumatic tire rim 61, and these lugs are provided with substantially circular openings 62, which are angularly countersunk to form a pair of conical surfaces 63 and 64 of the lug 60. Extending axially from the vehicle wheel 65 are a plurality of mounting and retaining bolts 66 of the type already described in the embodiment of Fig. 5, and these bolts extend through the openings 62 in the lugs 60 when the rim is mounted on the wheel. A double conical washer 67 is positioned on each bolt 66 between the wheel and the rim lug, one inclined surface of the washer seating against inclined surface 63 of the lug and the other against an oppositely inclined surface of the wheel 65 which is provided by angularly countersinking a substantially circular area of the wheel about the bolt 66. The members are held in assembled position by the frusto-conical retaining nut 68, the conical surface of which seats against the oppositely inclined surface 64 of the rim lug.

Figure 10:
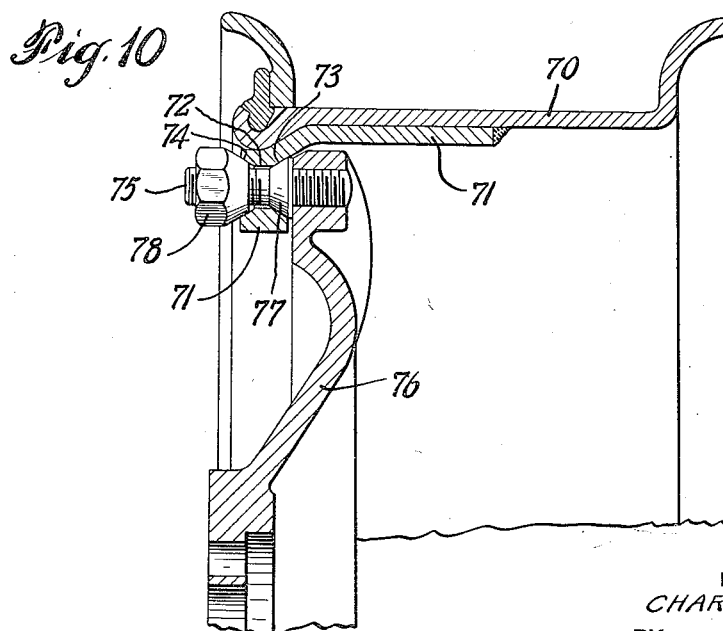
Fig. 10 is a cross section of a vehicle rim and wheel showing a further embodiment of the present invention.

In the embodiment of the invention shown by way of illustration in Fig. 10, the rim 70 is provided with a plurality of lugs 71 each having a substantially circular opening 72, which is countersunk on either side of the lug to form the inclined surfaces 73 and 74. The retaining and mounting bolt 75 is threaded into the vehicle wheel 76 and is provided with the annular enlarged portion 77 which holds the lug 71 spaced apart from the wheel 76 and an inclined surface of which seats against the oppositely inclined surface 73 of the lug. The rim is held in mounted position by the frusto-conical retaining nut 78 the inclined surface of which seats against the oppositely inclined surface 74 of the rim lug.

As shown in Fig. 5, an improved mounting and locking means for a wheel and hub assembly comprises a pair of frusto-conical locking washers 40 having the inclined surfaces 41 which are slipped over the mounting bolt 34 and arranged one on either side of the web of wheel 13, their inclined surfaces in assembled and locked position seating against the inclined surfaces 20, 21 of the wheel and the washer 40 positioned between the wheel 13 and hub 16 spacing those members apart. A spring ring 45 is provided to seat in a circumferential groove 46 in the central portion of bolt 34 whereby the inner of lock washers 40 maintains its position when the wheel is removed. The retaining nut 42 for resiliently drawing up and locking the assembly may be of conventional flat headed design. It will be apparent that the embodiment just described may be applied to other embodiments without departing from the scope of the invention herein.

In the demountable wheel and rim assemblies shown and described it will be apparent that with the mounting means of the present invention adjacent members which are to rotate together are securely and rigidly fixed together but are as easily assembled and disassembled as conventional constructions. It will be noted that there is no flat face to face engagement of such members when in assembled position, but that their only respective mounting surfaces are conical and cooperatingly formed so that one seats in and against the other. The members materially strengthen and reinforce each other, and the assembly in use operates as though the members were integral rather than separate. The vertical forces attendant upon supporting the rim or the wheel upon the wheel or the hub respectively, as the case may be, and the circumferential forces occurring when the rim or wheel is rotating or being accelerated or decelerated are transmitted directly between the adjacent members and not borne to any substantial degree by the mounting bolt. Loosening of the assembly and bending or breaking of the mounting bolt are obviated, and it is apparent that these common difficulties are met without the expensive and troublesome necessity of putting right hand threads on the wheel supporting bolts on one side of the vehicle and left hand threads on those of the other side, as has sometimes been done in the past. It may also be seen that the members of the assembly may be of somewhat lighter construction due to their operation as an integral unit and their ability to strengthen and steady each other.

Wheel assemblies having the mounting means of the present invention are, moreover, more economical to manufacture, for the tolerances of the mounting bolt and the mounting openings may be largely ignored and no closely defined specific measurements are required for the conical mounting surfaces in order to obtain the secure and solid assembly desired. A further economy results from the lack of necessity for making certain other fine adjustments and material preparation in manufacturing the members of the assembly. In manufacturing the embodiments of Figs. 9 and 10, for instance, wherein lug attached to rim types of assembly are shown, the lug and the rim may be placed in fixtures in accordance with their correctly aligned final position in the finished assembly, and the lug then securely welded to the rim. Neither the lug nor the rim need be carefully finished or machined prior to their jointure by welding and the only condition is that they be in such condition that a firm and lasting weld may be made. This eliminates considerable expense and time in the manufacturing of the wheel assemblies and results in a demountable rim mounting of improved operation.

The embodiment of the invention shown in Fig. 5 provides a resilient take up for the wheel and hub assembly and securely locks the various members in assembled position, as well as an improved mounting means for the members of the assembly.

The invention in its broader aspects is not limited to the specific mechanisms shown and described but departures may be made therefrom within the scope of the accompanying claims without departing from the principles of the invention and without sacrificing its chief advantages.

What I claim is:

1. In a vehicle wheel having a rim member and hub member and mounting means interconnecting the rim and hub members, a plurality of axially extending bolts fixed with respect to one of said members, double conical washers on said bolts and seated in the bolt supporting member, conical nuts cooperating with said bolts, said other member being provided with beveled apertures to be received over said bolts and between said nuts and washers, said nuts and washers being seated in said beveled apertures, whereby the driving and braking torque is taken by said nuts and washers.

2. In a vehicle wheel having a rim member and a hub member and mounting means interconnecting the rim and hub members, a plurality of circumferentially spaced axially extending bolts fixed with respect to one of said members, washers having inclined faces mounted on said bolts and seated in angularly countersunk recesses in the bolt supporting member surrounding said bolt, frusto-conical nuts threaded on the end of said bolts, said other member being provided with beveled apertures to be received over said bolts and between said nuts and washers, inclined faces of the nuts and washers being seated in the beveled apertures of said other member.

3. In a vehicle wheel assembly a rim, a hub, a plurality of circumferentially spaced axially extending bolts on the hub, said hub having angularly countersunk areas surrounding said bolts, rim supporting means connected to said rim and extending radially inwardly of said rim, a plurality of beveled apertures in said means to be received over said bolts, double conical washers on said bolts between the hub and supporting means, said washers being seated in the countersunk areas of the hub and in the beveled apertures of the supporting means, and conical nuts on the ends of the bolts away from the hubs and seated in the beveled apertures of the supporting means.

4. In a vehicle wheel assembly a rim, a wheel web connected to the rim and extending radially inwardly thereof, said wheel web having a plurality of circumferentially spaced beveled apertures therein, a hub, a plurality of circumferentially spaced axially extending bolts on the hub to extend through the apertures, the hub having an angularly countersunk area surrounding each bolt, double conical washers on the bolts between the hub and the wheel web and seated in the countersunk areas of the hub and the beveled apertures of the wheel web, and conical nuts on the ends of the bolts away from the hub and seated in the beveled apertures of the wheel web.

5. In a dual vehicle wheel having a pair of wheel members and a hub member and mounting means for mounting the wheel members on the hub member, a plurality of axially extending bolts fixed with respect to the hub member and extending through aligned beveled apertures in the wheel members, a pair of double conical washers for each bolt, one of said washers being positioned between one of said wheel members and the hub and being seated in the beveled aperture of the wheel and in the hub, and the other of said washers being positioned between the wheel members and seated in adjacent beveled apertures of the respective wheel members, and conical nuts on the ends of the bolts away from the hub member and seated in the beveled apertures of the wheel member away from the hub member.

6. In a vehicle wheel having a rim member and hub member and mounting means interconnecting the rim and hub members, a plurality of axially extending bolts fixed with respect to one of said members, said other member being provided with beveled apertures to be received over said bolts, members having double conical surfaces carried by said bolts and seating in the bolt supporting member and the beveled apertures, other members having conical surfaces carried by the bolts and seating in the beveled apertures, and cooperating nuts on said bolts for retaining seated said members having double conical surfaces and said other members having conical surfaces.

7. A vehicle wheel assembly comprising, in combination, a hub member, a plurality of circumferentially spaced axially extending bolts on the hub member, a rim member having a plurality of circumferentially spaced beveled apertures to be received over the bolts, members having double conical surfaces carried by the bolts between the rim member and the hub member and seating in the hub member and said apertures, other members having conical surfaces carried by the bolts on the side of the rim member away from the hub member and seating in said apertures, and nuts on the ends of the bolts for retaining seated said members having double conical surfaces and said other members having conical surfaces.

8. In a dual wheel assembly having a pair of rim members and a hub member and mounting means for mounting the rim members on the hub member, a plurality of axially extending bolts fixed with respect to the hub member and extending through aligned beveled apertures in the rim members, the hub member having an angularly countersunk area surrounding each bolt, a member having a double conical surface carried by each bolt between the hub and a first rim member and seated in the countersunk area of the hub and in the beveled aperture of the first rim member, a second member having a double conical surface carried by each bolt between the first and second rim members and seated in adjacent beveled apertures of the respective rim members, a third member having a single conical surface carried by each bolt and seated in the beveled apertures of the second rim member, and a nut carried by each bolt for retaining said members having double conical surfaces and said members having single conical surfaces seated.

9. In a vehicle wheel assembly a rim, a hub, a plurality of circumferentially spaced axially extending bolts on the hub, said hub having angularly countersunk areas surrounding said bolts, rim supporting means connected to said rim and extending radially inwardly of said rim, a plurality of beveled apertures in said means to be received over said bolts, members having double conical surfaces carried by said bolts between the hub and supporting means and seated in the countersunk areas of the hub and in the beveled apertures of the supporting means, members having single conical surfaces carried by said bolts at the side of the supporting means away from the hub and seating in the beveled apertures of the supporting means, and nuts carried by the bolts for retaining said members having double conical surfaces and said members having single conical surfaces seated.

CHARLES S. ASH.